United States Patent
Kuo et al.

(10) Patent No.: US 12,493,722 B2
(45) Date of Patent: Dec. 9, 2025

(54) DATA SECURITY VERIFICATION METHOD AND ELECTRONIC APPARATUS

(71) Applicant: ASPEED Technology Inc., Hsinchu (TW)

(72) Inventors: Chin-Ting Kuo, Hsinchu (TW); Chih-Chiang Mao, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 231 days.

(21) Appl. No.: 18/073,577

(22) Filed: Dec. 2, 2022

(65) Prior Publication Data

US 2024/0126928 A1 Apr. 18, 2024

(30) Foreign Application Priority Data

Oct. 18, 2022 (TW) .................................. 111139357

(51) Int. Cl.
 *G06F 21/64* (2013.01)
 *G06F 9/4401* (2018.01)
 (Continued)

(52) U.S. Cl.
 CPC ............ *G06F 21/64* (2013.01); *G06F 9/4401* (2013.01); *H04L 9/0825* (2013.01); *H04L 9/3247* (2013.01); *H04L 9/50* (2022.05)

(58) Field of Classification Search
 CPC ....... G06F 21/64–645; G06F 9/44–442; H04L 9/50; H04L 9/3236; H04L 9/3242–3249; H04L 9/0825
 See application file for complete search history.

(56) References Cited

U.S. PATENT DOCUMENTS

| | | | |
|---|---|---|---|
| 2006/0179302 A1* | 8/2006 | Hatakeyama | G06F 21/51 713/164 |
| 2009/0198991 A1* | 8/2009 | Owens | G06F 21/575 713/2 |

(Continued)

FOREIGN PATENT DOCUMENTS

| | | |
|---|---|---|
| CN | 102436566 | 5/2012 |
| CN | 105608386 | 5/2016 |

(Continued)

OTHER PUBLICATIONS

Regenscheid, Andrew. Platform firmware resiliency guidelines. No. NIST Special Publication (SP) 800-193 (Draft). National Institute of Standards and Technology, 2018. (Year: 2018).*

(Continued)

*Primary Examiner* — Madhuri R Herzog
(74) *Attorney, Agent, or Firm* — JCIPRNET

(57) ABSTRACT

A data security verification method and an electronic apparatus are provided. In the data security verification method, when the electronic apparatus is powered on, a verification circuit verifies integrity of an executable image in a storage device. If verification fails, the verification circuit stops a host processor from executing the executable image. If the verification is successful, the verification circuit releases a host reset, and a processor reads and executes the executable image. When the processor reads the executable image, the verification circuit re-verifies the executable image, and the processor executes the executable image according to a verification result.

20 Claims, 12 Drawing Sheets

(51) Int. Cl.
    *H04L 9/00*          (2022.01)
    *H04L 9/08*          (2006.01)
    *H04L 9/32*          (2006.01)

(56) References Cited

U.S. PATENT DOCUMENTS

| | | | |
|---|---|---|---|
| 2010/0169967 | A1 | 7/2010 | Khosravi et al. |
| 2014/0325644 | A1* | 10/2014 | Oberg .................... G06F 21/57 726/22 |
| 2017/0289151 | A1* | 10/2017 | Shanahan ........... G06F 12/0875 |
| 2018/0331834 | A1* | 11/2018 | Nagano .................... H04L 9/30 |
| 2019/0236281 | A1* | 8/2019 | Hershman ............... G06F 21/85 |
| 2021/0312057 | A1* | 10/2021 | Kloth .................... G06F 21/575 |

FOREIGN PATENT DOCUMENTS

| | | | | | |
|---|---|---|---|---|---|
| CN | 114237637 | A | * | 3/2022 | ............. G06F 21/64 |
| TW | 202137036 | | | 10/2021 | |

OTHER PUBLICATIONS

"Office Action of Taiwan Counterpart Application", issued on Apr. 28, 2023, p. 1-p. 9.

* cited by examiner

DATA SECURITY VERIFICATION METHOD AND ELECTRONIC APPARATUS

CROSS-REFERENCE TO RELATED APPLICATION

This application claims the priority benefit of Taiwan application serial no. 111139357, filed on Oct. 18, 2022. The entirety of the above-mentioned patent application is hereby incorporated by reference herein and made a part of this specification.

BACKGROUND

Technical Field

The disclosure relates to a data verification method and an apparatus, and more particularly, to a data security verification method and an electronic apparatus.

Description of Related Art

The existing platform firmware resiliency (PFR) mechanism only verifies a static executable image once when the platform is powered on, and then a board management controller (BMC) or a host may fetch the executable image from the static memory.

However, the PFR architecture cannot handle a side channel attack. All static images are verified only once at time of check (TOC) (i.e., a T-1 phase of the PFR) before a host reset is released, and therefore cannot guarantee that content in the static memory is correct at time of use (TOU) (i.e., a TO phase of the PFR). To be specific, after the T-1 phase of the PFR, a hacker may use physical properties such as a voltage glitch, clock frequency, temperature, etc. to change multiple bits in the static memory, or direct a read path to other static memories, resulting in the BMC or the host reading a modified malicious image.

In addition, in the T-1 phase, the PFR needs to read all executable images from all static memories on the platform, and perform integrity verification before entering the TO phase. Due to the considerable image capacity, the verification process will cost a lot of time. When the number of elements required to execute the firmware increases, the time spent in the T-1 phase also increases.

SUMMARY

The disclosure provides a data security verification method and an electronic apparatus, which may improve the security of image data by verifying an executable image in a static memory at time of check (TOC) and time of use (TOU).

The disclosure provides a data security verification method, which is adapted for an electronic apparatus having a storage device, a verification circuit, and a processor. The method includes the following steps: when the electronic apparatus is in a boot process, the verification circuit verifies integrity of an executable image in the storage device; if the verification fails, the verification circuit stops the processor from reading and executing the executable image; if the verification is successful, the verification circuit determines that the processor may read and execute the executable image, and releases a host reset, and when the processor intends to read a part or the whole of the executable image, the verification circuit re-verifies the part or the whole of the executable image with another integrity verification program, and determines whether the processor may read and execute the part or the whole of the executable image according to the verification result.

In some embodiments, the step of the verification circuit verifying the integrity of the executable image in the storage device includes: root hash of the executable image in the storage device is verified with a built-in signature, and if the root hash is invalid, the verification circuit stops a host processor from executing the executable image; and if the root hash is valid, the verification circuit determines that the processor may read and execute the executable image and releases the host reset.

In some embodiments, when the processor intends to read the part or the whole of the executable image in the storage device, the step of the verification circuit re-verifying the part or the whole of the executable image with another integrity verification program includes: when the processor intends to read one of data blocks of the executable image, the verification circuit calculates hash of the data block with a hash tree created with multiple data blocks, and calculates upward to hash of a root node of the hash tree, so as to compare the hash calculated with the root hash verified in the boot process, and determine the validity of the data block according to the comparison result, and immediately stops the read behavior of the processor and takes corresponding measures if the data block is invalid.

In some embodiments, the method further includes: a hash tree is created with multiple data blocks, which includes calculating hash of the data blocks of the executable image as multiple terminal nodes at the bottom of the hash tree, and calculating upward hash of multiple intermediate nodes and the root node of the hash tree.

In some embodiments, the step of creating the hash tree with multiple data blocks further includes: at least one attribute is assigned to each of the data blocks, or the data blocks that are frequently read consecutively and are adjacent are merged, and hash of the data blocks merged is calculated.

In some embodiments, the step of creating the hash tree with multiple data blocks further includes: an attribute tag is added to a terminal node or an intermediate node of the hash tree to record at least one attribute of the corresponding data block, and the attribute includes the size, importance, number of reads, frequency of reads, or a verification policy of the data block.

In some embodiments, after the step of successful verification and the release of the host reset, the method further includes: the processor enables the verification circuit to encrypt the executable image with a built-in key, and store the encrypted executable image in a memory, and the key includes a key in a symmetric cryptography or a key in an asymmetric cryptography.

In some embodiments, if the memory is a dynamic memory, the method further includes: when the processor intends to read the part or the whole of the encrypted executable image stored in the memory, the verification circuit decrypts the part or the whole of the executable image with the key, and determines whether the processor may read and execute the part or the whole of the executable image according to the part or the whole of the decrypted executable image.

In some embodiments, if the memory is a static memory, the method further includes: when the processor intends to read the part or the whole of the encrypted executable image stored in the memory, the verification circuit decrypts the part or the whole of the executable image with the key, verifies the integrity of the part or the whole of the decrypted executable image or performs another integrity verification program on the part or the whole of the decrypted executable image, and determines whether the processor may read and execute the part or the whole of the executable image according to the verification result.

In some embodiments, the method further includes: the verification circuit stores the executable image with secure flash.

The disclosure provides an electronic apparatus, which includes a storage device, a verification circuit, and a processor. The storage device is configured to store executable images. The verification circuit is a coupled circuit and is configured to verify integrity of the executable image in the storage device when the electronic apparatus is in a boot process. If the verification fails, the verification circuit stops a host processor from executing the executable image. If the verification is successful, the verification circuit determines that the processor may read and execute the executable image, and releases a host reset. The processor is coupled to the storage device and the verification circuit, and is configured to read and execute the executable image when the verification circuit releases the host reset. When the processor intends to read a part or the whole of the executable image in the storage device, the verification circuit re-verifies the integrity of the whole or the part of the executable image with another integrity verification program, so as to determine the validity of at least one data block corresponding to the whole or the part of the executable image according to the verification result, and immediately stops the read behavior of the processor and takes corresponding measures if the at least one data block is invalid.

In some embodiments, the verification circuit includes verifying the root hash of the executable image in the storage device with a built-in signature, stopping the host processor from executing the executable image when the root hash is invalid, and determining that the processor may read and execute the executable image and releasing the host reset when the root hash is valid.

In some embodiments, the processor includes, when intending to read one of data blocks of the executable image, the verification circuit calculating hash of the data block with a hash tree created with multiple data blocks, and calculating upward to the hash of a root node of the hash tree, so as to compare the hash calculated with the root hash verified in the boot process, and determine the validity of the data block according to the comparison result, and immediately stopping the reading behavior of the processor and taking corresponding measures if the data block being invalid.

In some embodiments, the verification circuit further create a hash tree with multiple data blocks, which includes calculating hash of multiple data blocks of the executable image as multiple terminal nodes at the bottom of the hash tree, and calculating upward hash of multiple intermediate nodes and the root node of the hash tree.

In some embodiments, the verification circuit further assigns at least one attribute to each of the data blocks, or merges the data blocks that are frequently read consecutively and are adjacent, and calculates hash of the data blocks merged.

In some embodiments, the verification circuit further adds an attribute tag to the terminal node or the intermediate node of the hash tree to record at least one attribute of the corresponding data block, and the attribute includes the size, importance, number of reads, frequency of reads, or a verification policy of the data block.

In some embodiments, the processor further enables the verification circuit to encrypt the executable image with a built-in key, and store the encrypted executable image in a memory, and the key includes a key in a symmetric cryptography or a key in an asymmetric cryptography.

In some embodiments, if the memory is a dynamic memory, when the processor intends to read the part or the whole of the encrypted executable image stored in the memory, the verification circuit decrypts the part or the whole of the executable image with the key, and determines whether the processor may read and execute the part or the whole of the executable image according to the part or the whole of the decrypted executable image.

In some embodiments, if the memory is a static memory, when the processor intends to read the part or the whole of the encrypted executable image stored in the memory, the verification circuit decrypts the part or the whole of the executable image with the key, verifies the integrity of the part or the whole of the decrypted executable image or performs another integrity verification program on the part or the whole of the decrypted executable image, and determines whether the processor may read and execute the part or the whole of the executable image according to the verification result.

In some embodiments, the verification circuit further stores the executable image with secure flash.

The data security verification method and the electronic apparatus of the disclosure not only verify the executable image in the static memory at the TOC, but also verify the data block read when the executable image is read at the TOU, thereby preventing the memory from being subjected to the side channel attack. Moreover, the disclosure may improve the system performance while enhancing the security of the data through the verification of the root hash or the encryption and decryption of the data.

In order to make the aforementioned features and advantages of the disclosure comprehensible, embodiments accompanied with drawings are described in detail as follows.

DESCRIPTION OF THE EMBODIMENTS

A data security verification method and an electronic apparatus according to an embodiment of the disclosure employ a dual verification mechanism for verifying an executable image at time of check (TOC) and time of use (TOU). In addition to integrity of image data being verified by the platform firmware resiliency (PFR) or a secure microcontroller (MCU) at the TOC, integrity of the executable image is also verified at the TOU whenever a host reads a data block of the executable image from a static memory, so as to ensure that the data therein is not tampered with, thereby enhancing the security of the data. In addition, the embodiment of the disclosure also combines a verification structure of a hash tree, and only a small piece of data needs to be verified in the verification process, thereby reducing the time required for verifying a large amount of data.

Figure 1:
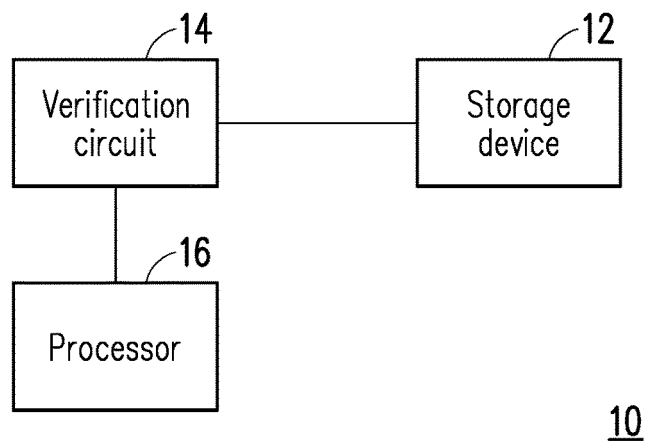
FIG. 1 is a block diagram of an electronic apparatus according to an embodiment of the disclosure.

FIG. 1 is a block diagram of an electronic apparatus according to an embodiment of the disclosure. Referring to FIG. 1, an electronic apparatus 10 of the embodiment includes a storage device 12, a verification circuit 14, and a processor 16, and the functions thereof are described as follows.

The storage device 12 is, for example, a non-volatile memory (NVM), such as a flash memory or any type of read-only memory (ROM), but is not limited thereto. The storage device 12 is configured to store executable images of the electronic apparatus 10, and the executable images are stored in the storage device 12 in the form of, for example, a binary image. In some embodiments, the storage device 12 may be Secure Flash, which may automatically encrypt and verify the stored data, and may detect intrusions and resist attacks, thereby ensuring the integrity of the internal data of the electronic apparatus 10 and improving the protection capability of the system.

The verification circuit 14 is, for example, a programmable general-purpose or special-purpose microprocessor (MPU), a microcontroller (MCU), an application specific integrated circuit (ASIC), a programmable logic device (PLD) or other similar devices or a combination thereof, but is not limited thereto. In some embodiments, the verification circuit 14 is, for example, the platform firmware resiliency (PFR), which acts as a security control center of the platform or the entire system, that is, as root of trust (RoT). The verification circuit 14 verifies the integrity of all static executable images to be executed on the platform before the processor 16 performs execution, and monitors the flow of all buses and the status of the processor 16 after the electronic apparatus 10 is powered on.

The processor 16 is, for example, a central processing unit (CPU), a graphics processing unit (GPU), a digital signal processor (DSP), an image signal processor (ISP) or other similar devices or a combination thereof, but is not limited thereto. The processor 16 is the main processor of the electronic apparatus 10 and is configured to perform most of the work.

In some embodiments, the verification circuit 14 and the processor 16 are integrated, for example, in the same system on a chip (SoC), to reduce circuit board area or power consumption and improve performance. In other embodiments, the verification circuit 14 may also be a secure MCU independent of the processor 16, which is configured, for example, on a printed circuit board (PCB) as the RoT of hardware to protect the system from the malware attacks.

Figure 2:
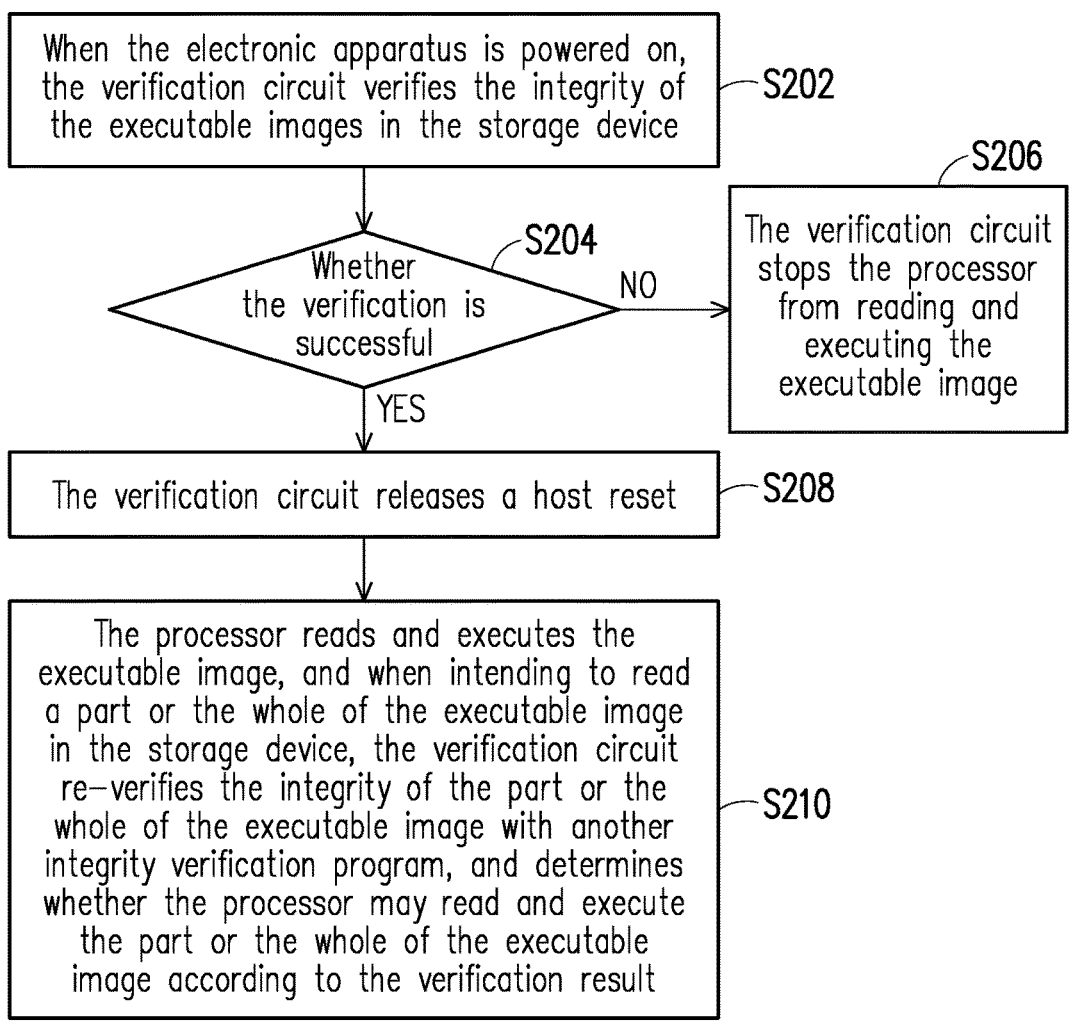
FIG. 2 is a flowchart of a data security verification method according to an embodiment of the disclosure.

FIG. 2 is a flowchart of a data security verification method according to an embodiment of the disclosure. Please refer to FIGS. 1 and 2 at the same time. The method of the embodiment is adapted for the above-mentioned electronic apparatus 10. The detailed steps of the data security verification method of the embodiment are described in conjunction with various elements of the electronic apparatus 10 as follows.

In step S202, when the electronic apparatus 10 is powered on, the verification circuit 14 verifies integrity of the executable images in the storage device 12. In some embodiments, the verification circuit 14 verifies the integrity of the executable image by, for example, verifying root hash of the executable image, or decrypts the executable image and then performs verification. For example, the verification circuit 14 reads the executable image from the storage device 12 when the processor 16 is in a reset state, and verifies the integrity and validity of the executable image with a secure hash algorithm (SHA) and a digital signature.

In step S204, the verification circuit 14 determines whether the verification of integrity is successful. If the verification fails, this method proceeds to step S206, and the verification circuit 14 stops the processor 16 from reading and executing the executable image. In some embodiments, the verification circuit 14, for example, resets the host associated with the executable image of which the verification fails to prevent the host from executing the problematic executable image, and notifies the system administrator to process the executable image.

In step S204, if the verification is successful, this method proceeds to step S208, in which the verification circuit 14 releases a host reset. In step S210, the processor 16 reads and executes the executable image. When the processor 16 intends to read a part or the whole of the executable image, the verification circuit re-verifies the integrity of the part or the whole of the executable image with, for example, another integrity verification program, and determines whether the processor may read and execute the part or the whole of the executable image according to the verification result. In some embodiments, the verification circuit 14 verifies the integrity of the executable image, for example, by verifying the root hash of the executable image or executing the SHA on the executable image.

Through the above method in the embodiment, the security of reading data from the static storage device may be enhanced, and the system may be ensured to be protected from a side channel attack on the static storage device.

Figure 3:
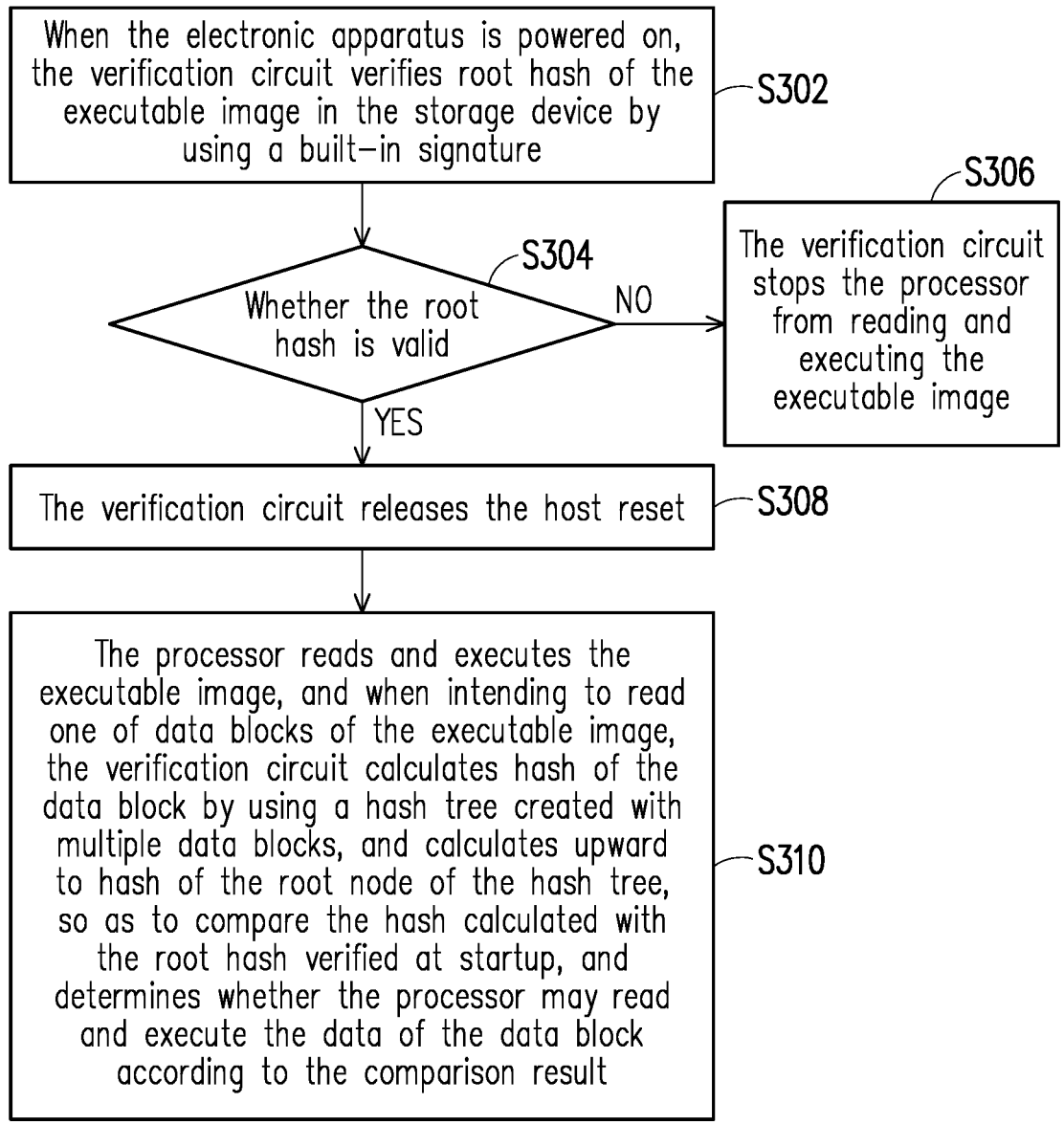
FIG. 3 is a flowchart of a data security verification method according to an embodiment of the disclosure.

FIG. 3 is a flowchart of a data security verification method according to an embodiment of the disclosure. Please refer to FIGS. 1 and 3 at the same time. The method of the embodiment is adapted for the above-mentioned electronic apparatus 10. The detailed steps of the data security verification method of the embodiment are described in conjunction with various elements of the electronic apparatus 10 as follows.

In step S302, when the electronic apparatus 10 is powered on, the verification circuit 14 verifies the root hash of the executable image in the storage device 12 with a built-in signature, thereby verifying the integrity of the executable image in the storage device 12.

In some embodiments, before the electronic apparatus 10 is shipped out from the factory, in addition to creating an executable image (e.g., a firmware image), a hash tree of the executable image is also created. The hash tree of the executable image includes calculating hash of multiple data blocks of the executable image as multiple terminal nodes of the hash tree, and calculating upward hash of multiple intermediate nodes and a root node of the hash tree.

The hash of the root node of the hash tree is, for example, signed with a private key in an asymmetric cryptography to generate a signature of the root node. The electronic apparatus writes the executable image to the storage device 12 together with the signature and the root node (hash). When the electronic apparatus 10 is powered on, the verification circuit 14 verifies the signature with a public key to solve the hash of the root node. The public key is generated, for example, with the private key, and the data encrypted by the private key can only be decrypted with the public key. The private key is kept by the manufacturer of the electronic apparatus 10 and is not disclosed to the public, while the public key may be disclosed to the public. In addition to decrypting the signature, the verification circuit 14 also reads the executable image from the storage device 12 to calculate the root hash of the executable image, and compares the root hash calculated with the hash of the root node validated after powering on to verify the integrity of the executable image.

In some embodiments, the verification circuit 14 stores the hash of all nodes of the hash tree in a memory inside the electronic apparatus 10. The root hash verified to be valid in S302 is, for example, stored in a protected system on a chip (SoC) cache or secure memory to prevent the hash from being tampered with and ensure that only the verification circuit may do access. In other embodiments, the verification circuit 14 may also store the public key used to verify the root hash in a one-time programmable (OTP) device such as an electronic fuse (eFuse) to prevent the public key from being tampered with.

In step S304, the verification circuit 14 determines whether the root hash is valid. If the root hash is determined to be invalid, the method proceeds to step S306, and the verification circuit 14 stops the processor 16 from reading and executing the executable image. Conversely, if the root hash is determined to be valid, the method proceeds to step S308, and the verification circuit 14 determines that the processor 16 may read and execute the executable image and therefore releases the host reset. Moreover, the verification circuit 14 may, for example, determine whether the root hash calculated is the same as the hash of the root node verified at startup (in a boot process). If the root hash calculated is different from the hash of the root node verified at startup, the root hash calculated may be determined to be invalid. However, if the root hash calculated is the same as the hash of the root node verified at startup, the root hash calculated may be determined to be valid.

In step S310, the processor 16 reads and executes the executable image. When the processor 16 intends to read one of the data blocks of the executable image, the verification circuit 14 calculates the hash of the data block by, for example, using the hash tree created with multiple data blocks, and calculates upward to the hash of the root node of the hash tree, so as to compare the hash calculated with the root hash verified at startup, thereby determining whether the processor 16 may read and execute the data of the data block according to the comparison result.

The method of verifying integrity by comparing the root hash may not only enhance the security of reading data from the static storage device, but may also reduce the time required for verification compared to verifying the complete executable image, thereby improving system performance. When booting, in the case where multiple hosts fetch individual executable images at the same time, the method of the embodiment may also ensure the integrity of the individual executable images in a short time and release the host reset accordingly, so as to quickly support multiple host verification and execute the executable images.

Figure 4:
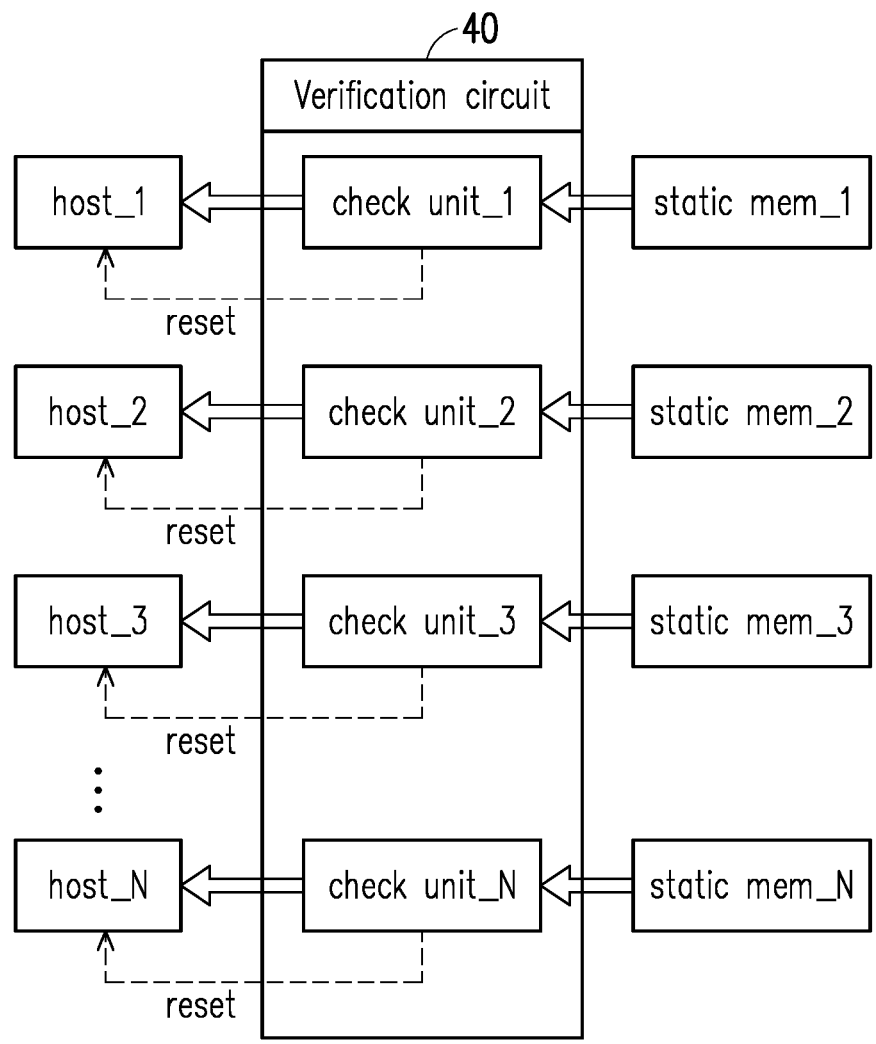
FIG. 4 is an example of a data security verification method according to an embodiment of the disclosure.

For example, FIG. 4 is an example of a data security verification method according to an embodiment of the disclosure. Referring to FIG. 4, a verification circuit 40 of the embodiment includes N verification units check unit_1 to check unit_N, which are respectively configured to verify the integrity of the data in static memories static mem_1 to static mem_N, while N is a positive integer. The verification units check unit_1 to check unit_N verify the root hash of executable images in the static memories static mem_1 to static mem_N by, for example, using the built-in signature, so as to confirm the integrity of the executable images.

If the root hash is verified to be valid, the verification units check unit_1 to check unit_N release the host resets for hosts host_1 to host_N, and the hosts host_1 to host_N read and execute the executable images in the static memories static mem_1 to static mem_N. If the root hash is verified to be invalid, the verification units check unit_1 to check unit_N send reset signals reset to the corresponding hosts host_1 to host_N to reset the hosts host_1 to host_N and stop reading and execution of the executable images. Verifying just the root hash through this method, the time required is much less than it takes to verify the entire executable image. Therefore, the verification circuit 40 may quickly ensure the integrity of data in multiple static memories, and achieve the technical effect of simultaneously authorizing multiple hosts to execute executable images in a short period of time.

FIGS. 5A to 5D are examples of creating a hash tree according to an embodiment of the disclosure. Please refer to FIGS. 4 and FIGS. 5A to 5D at the same time. The embodiment describes an implementation manner in which the verification unit check unit_N in FIG. 4 verifies the executable image image_N in the static memory static mem_N and creates a hash tree.

Figure 5A:
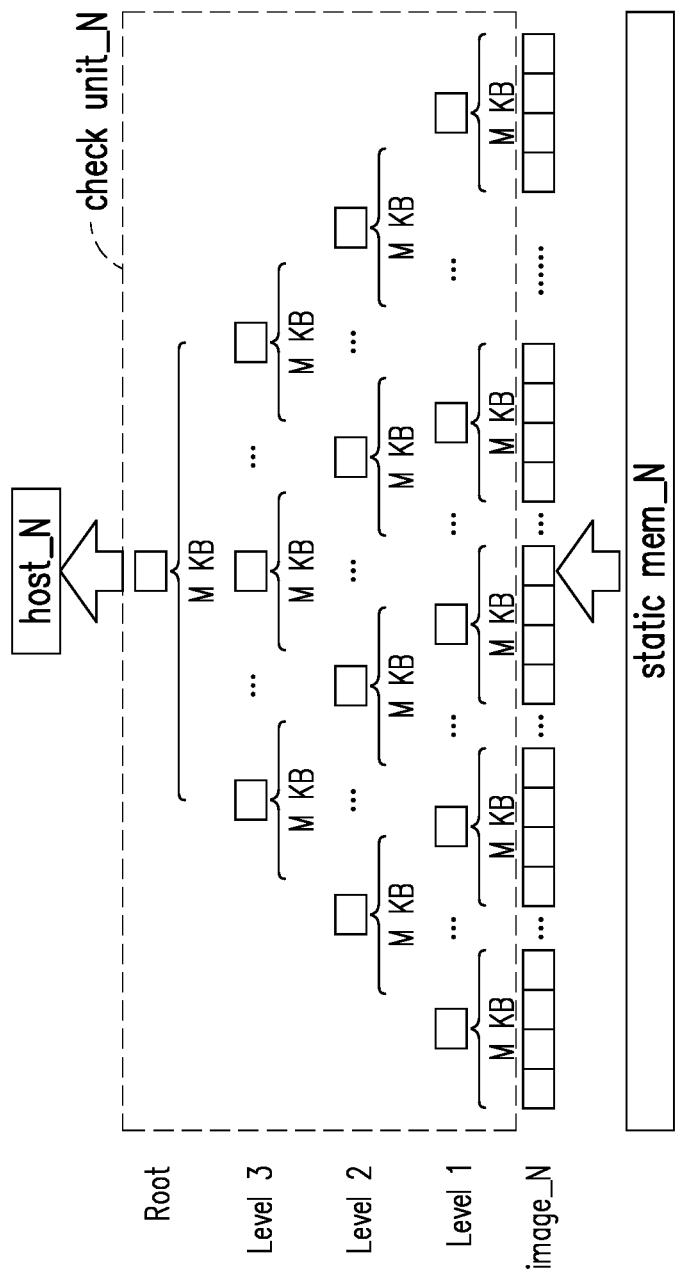
FIGS. 5A to 5D are examples of creating a hash tree according to an embodiment of the disclosure.
Figure 5B:
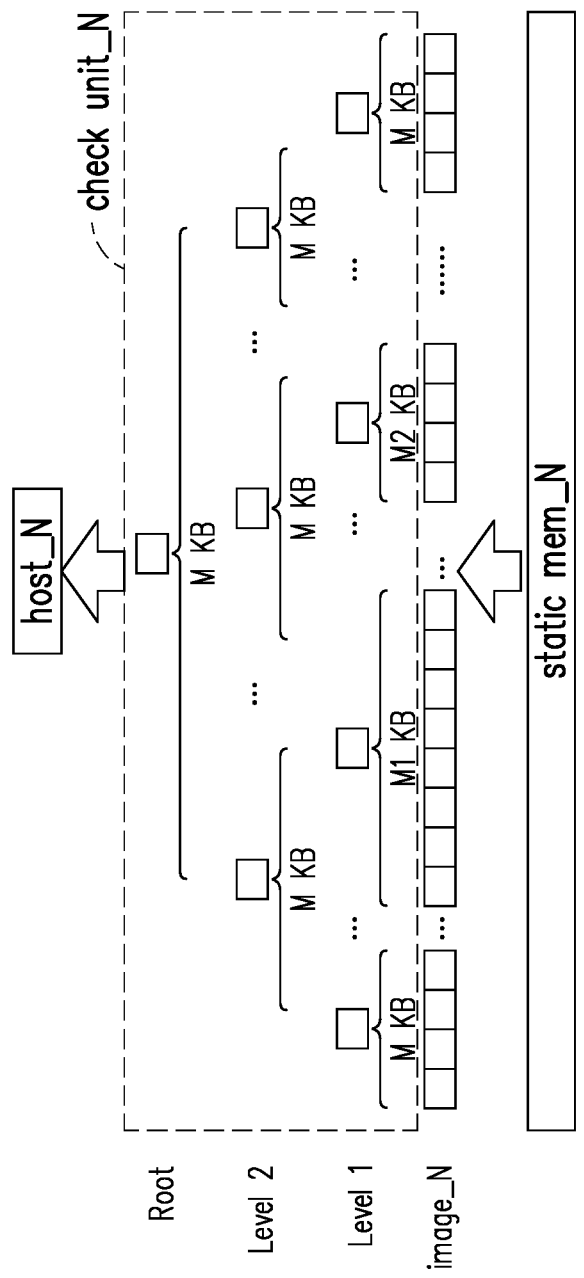
Figure 5C:
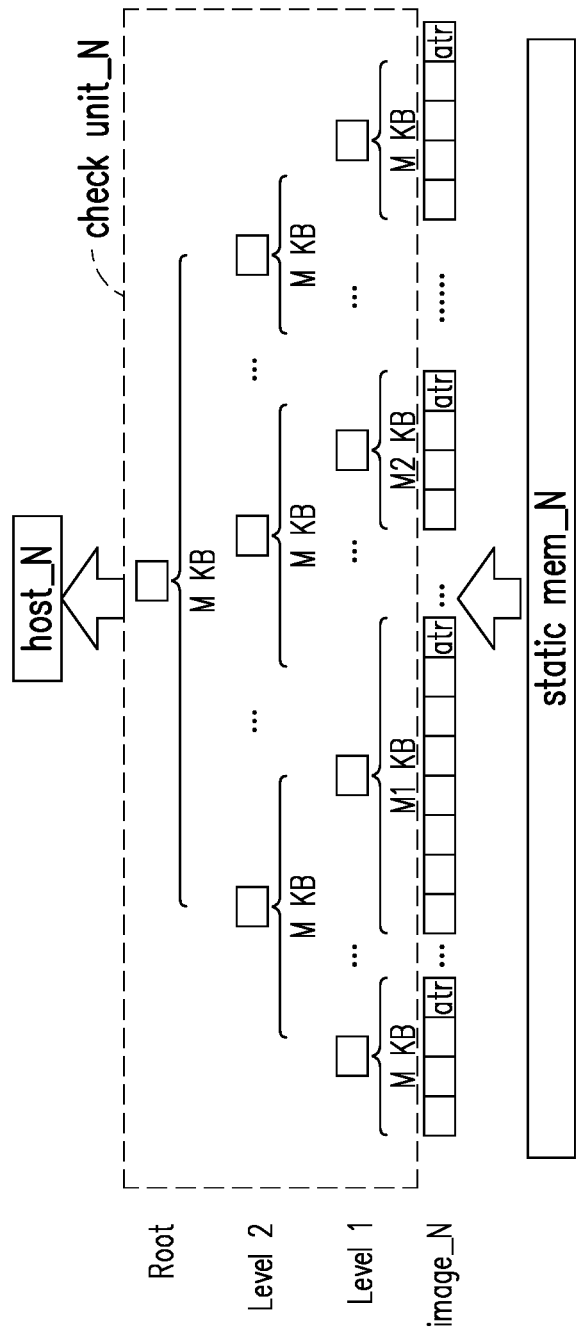
Figure 5D:
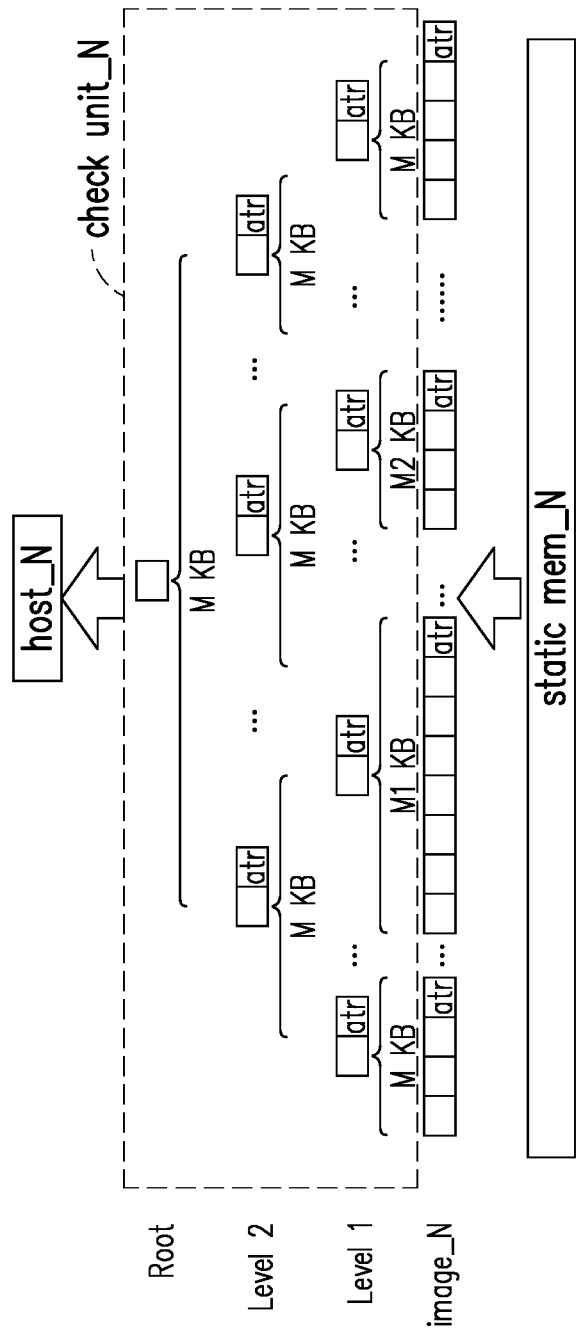

Referring to FIG. 5A, the verification unit check unit_N, for example, divides the executable image image_N in the static memory static mem_N into multiple data blocks of M kilobyte (KB), and calculates the hash of these data blocks as tags of multiple nodes at level 1 of the hash tree (i.e., terminal nodes at the bottom level), and M is a positive integer. When the host host_N intends to read one of the data blocks of the executable image image_N, the verification unit check unit_N, for example, uses the hash tree pre-created with multiple data blocks, and recalculates the hash of the node where the data block is located, and calculates upward the hash of the nodes related to the data block in levels 2 and 3 of the hash tree as the tags of these nodes, until the hash of the node at the root of the tree (i.e., the root node) is calculated. In addition to the necessary recalculation of the hash of the nodes related to the data block, other nodes may use the ready-made hash in the hash tree, so as to reduce the time required for calculating the hash. Moreover, the verification unit check unit_N, for example, calculates the hash of multiple child nodes under each of the nodes as the tag of the node. In addition, the verification unit check unit_N compares the hash of the root node calculated with the root hash verified at startup to determine whether the data block of the executable image image_N read is valid. If the determination result is valid, the host_N reads the data block of the executable image image_N. However, if the determination result is invalid, the verification unit check unit_N resets the host host_N to prevent the host host_N from reading the invalid data block of the executable image image_N.

In some embodiments, the verification unit check unit_N may, for example, merge multiple data blocks to calculate hash according to usage scenarios (e.g., with attributes such as the size, importance, the number of reads, or the frequency of reads of the data blocks), so as to improve the efficiency of the hash calculation. For example, in FIG. 5B, the verification unit check unit_N merges multiple data blocks that are frequently read continuously into a data block with a size of M1 KB, and calculates the hash of the data block merged as the tag of the corresponding node in the hash tree. Based on the characteristics of the hash algorithm, for the same executable image, when the size of the divided data block increases, the performance of calculating the hash of a few larger data blocks is higher than the performance of calculating the hash of many smaller data blocks. For example, for a data block of 256 KB, calculating the hash of the entire data block at once is faster than calculating the hash of the data block 64 times (4 KB each time). In addition, when the data blocks are merged or the data is cut into larger blocks, the number of corresponding nodes in the hash tree is reduced, and the path from the terminal node to the root node is shortened, resulting in the reduction in the overall time to read data. Therefore, through the above-mentioned method of merging the data blocks of which attributes are the same or similar and calculating the hash, the performance of the system executing the hash algorithm and reading the executable image may be improved. In some embodiments, multiple data blocks read consecutively may be merged as required, or the layout of the executable image in the static memory may be arranged, so as to improve the performance of reading the executable image.

In some embodiments, the verification unit check unit_N may add an attribute tag for each of the data blocks divided. The attribute tag may record the at most number of times that the data block may be verified or read (e.g., 1 time, 2 times or no limit) or other verification policies. The verification policy may be determined based on the frequency of reads or importance of the protected executable image. For example, in FIG. 5C, for each of the data blocks segmented from the executable image image_N, an attribute tag atr may be added. In this way, for a low-end device with insufficient resources, the attribute tag atr may be configured to adjust the verification policy, such as appropriately reducing the number or frequency of verification for relatively unimportant data, thereby maintaining system performance.

In some embodiments, in addition to adding the attribute tag to each of the data blocks, the verification unit check unit_N may also add an attribute tag to each of the nodes of the hash tree. For example, in FIG. 5D, the attribute tag atr is added to each of the data blocks segmented from the executable image image_N, and the attribute tag atr is also added to each of the nodes of the hash tree. In this way, when calculating the hash of the node, the verification unit check unit_N may read the attribute tag atr of the node to determine the verification policy of each of the nodes, thereby improving system performance and security.

Figure 6:
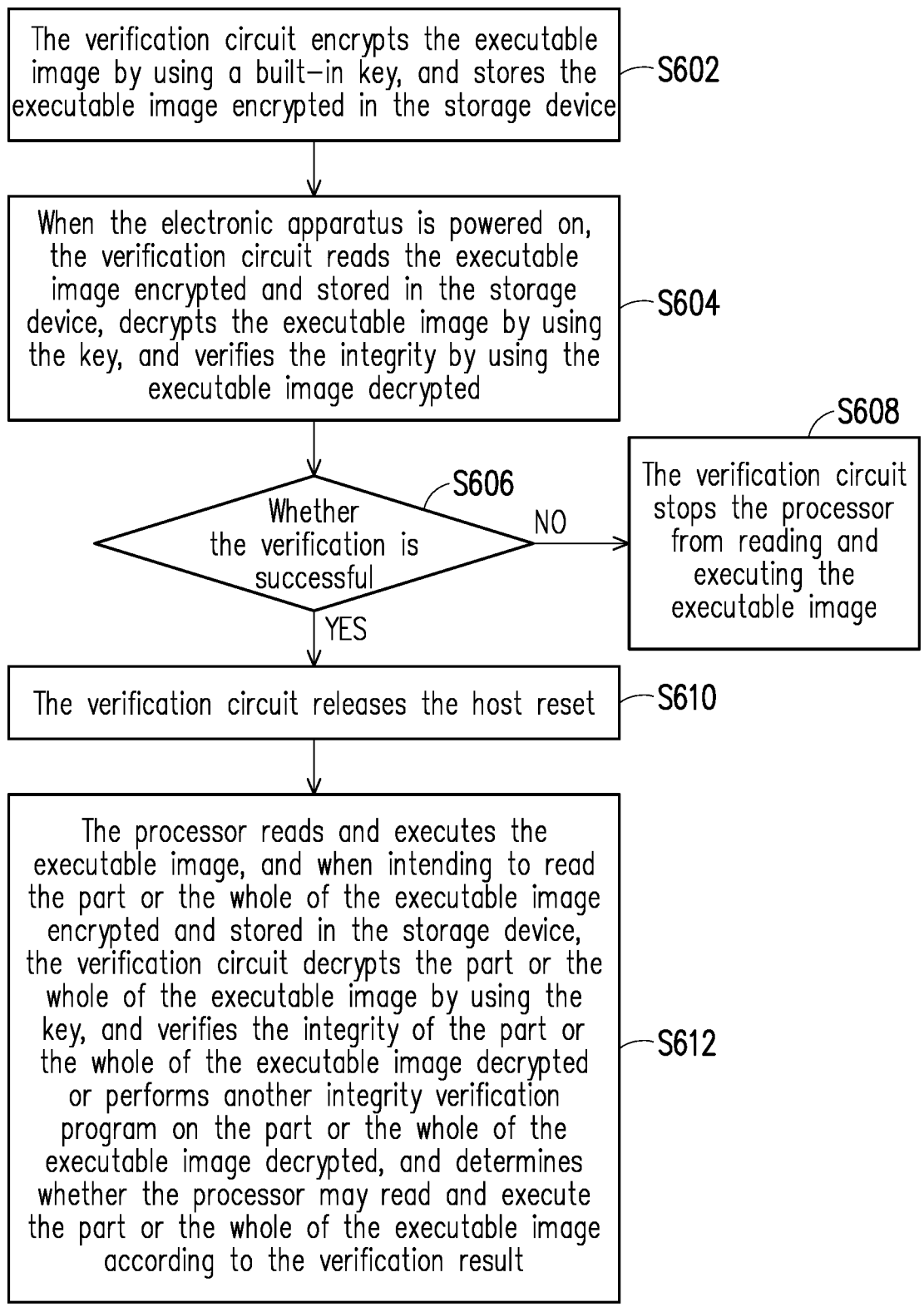
FIG. 6 is a flowchart of a data security verification method according to an embodiment of the disclosure.
Figure 7:
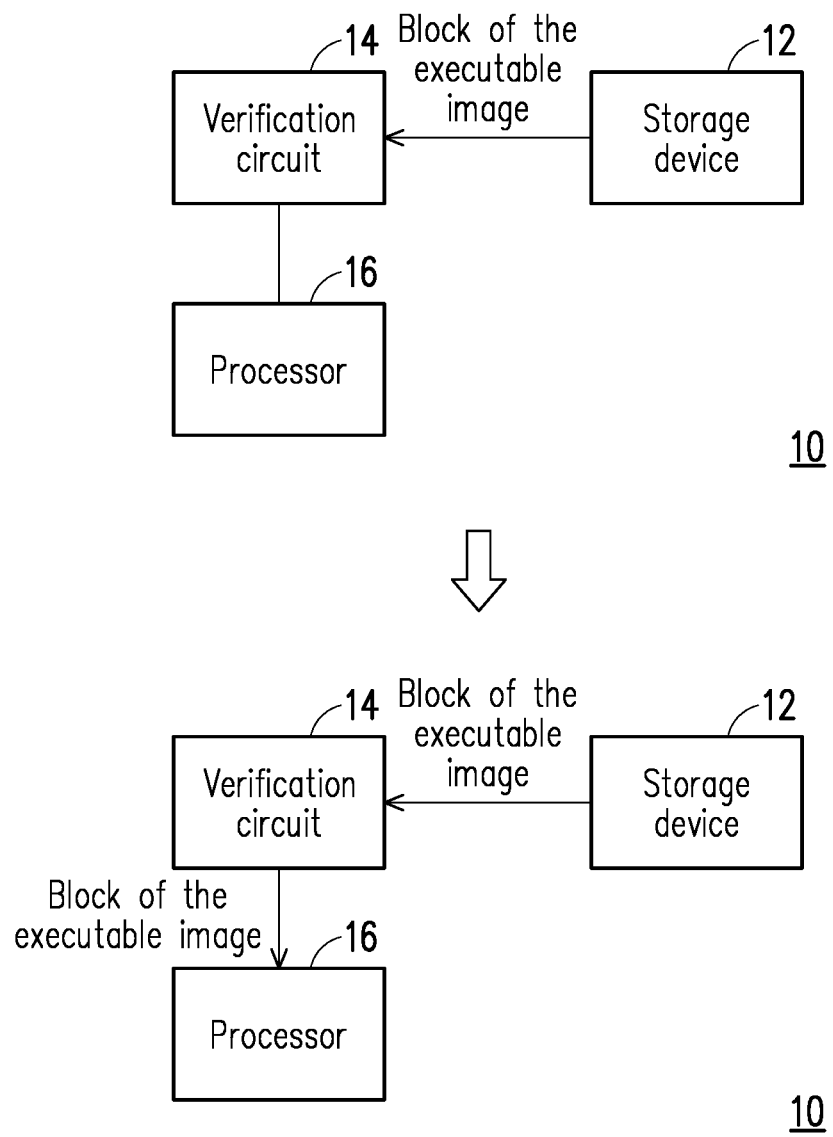
FIG. 7 is a schematic diagram of an electronic apparatus executing a data security verification method according to an embodiment of the disclosure.

FIG. 6 is a flowchart of a data security verification method according to an embodiment of the disclosure. FIG. 7 is a schematic diagram of an electronic apparatus executing a data security verification method according to an embodiment of the disclosure. Please refer to FIGS. 6 and 7 at the same time. The method of the embodiment is adapted for the electronic apparatus shown in FIG. 7, which includes the storage device 12, the verification circuit 14, and the processor 16 shown in FIG. 1.

In step S602, the verification circuit 14 encrypts the executable image with the built-in key, and stores the encrypted executable image in the storage device 12. The key is, for example, in a symmetric cryptography or an asymmetric cryptography, but is not limited thereto.

In some embodiments, the above-mentioned key is, for example, an identification code generated by a device identifier composition engine (DICE), and the key is bound in the electronic apparatus 10, for example, when the processor 16 or the verification circuit 14 is manufactured, that is, the key is unique among different chips. Since the key is stored inside the apparatus and is set to be inaccessible by software, an external hacker is unable to obtain the key through software behavior for using the key to conduct a malicious attack.

In some embodiments, a digital signature is generated for the executable image or the root hash of the executable image with the private key in the asymmetric cryptography, and stored in the storage device 12 before the electronic apparatus 10 is shipped out from the factory; on the other hand, the public key in the asymmetric cryptography is stored internally in the electronic apparatus 10, so that the public key may be used to verify the integrity of the executable image in the subsequent S604.

In step S604, when the electronic apparatus 10 is powered on (in a boot process), the verification circuit 14 reads the encrypted executable image stored in the storage device 12, decrypts the executable image with the key, and verifies the integrity of the decrypted executable image. The verification circuit 14, for example, executes the SHA on the decrypted executable image to verify the integrity of the executable image.

In step S606, the verification circuit 14 determines whether the verification of integrity is successful. If the verification fails, then proceeds to step S608, and the verification circuit 14 stops the processor 16 from reading and executing the executable image. In step S606, if the verification is successful, the method proceeds to step S610, and the verification circuit 14 releases the host reset. The above-mentioned steps S606 to S610 are the same as or similar to the steps S204 to S208 of the foregoing embodiment, so the detailed contents thereof are not repeated here.

The embodiment is different from the previous embodiment in that in step S612, the processor 16 reads and executes the executable image, and when the processor 16 intends to read the part or the whole of the encrypted executable image stored in the storage device 12, the verification circuit 14 decrypts the part or the whole of the executable image with the key again, and verifies the integrity of the part or the whole of the decrypted executable image or performs another integrity verification program on the part or the whole of the decrypted executable image, so as to determine whether the processor 16 may read and execute the part or the whole of the executable image according to the verification result. In some embodiments, the processor 16, for example, reads multiple blocks of the executable image sequentially, and the verification circuit 14 decrypts the block of the executable image read with the key, and verifies the integrity of the block of the decrypted executable image, so as to determine whether the processor 16 may read and execute the block of the executable image according to the verification result.

As shown in FIG. 7, the verification circuit 14 first decrypts and verifies the integrity of the block of the executable image in the storage device 12 (S604). Then, if the processor 16 needs to read and execute the content of the block of the executable image in the storage device 12, the verification circuit 14 still needs to perform decryption and integrity verification before the processor 16 is allowed to read and execute the block of the executable image. In this way, even if the block of the executable image in the storage device 12 is replaced by a malicious image after verified, the malicious image cannot be executed after decrypted with the key, thereby ensuring the security of the executable image executed by the processor 16.

Figure 8:
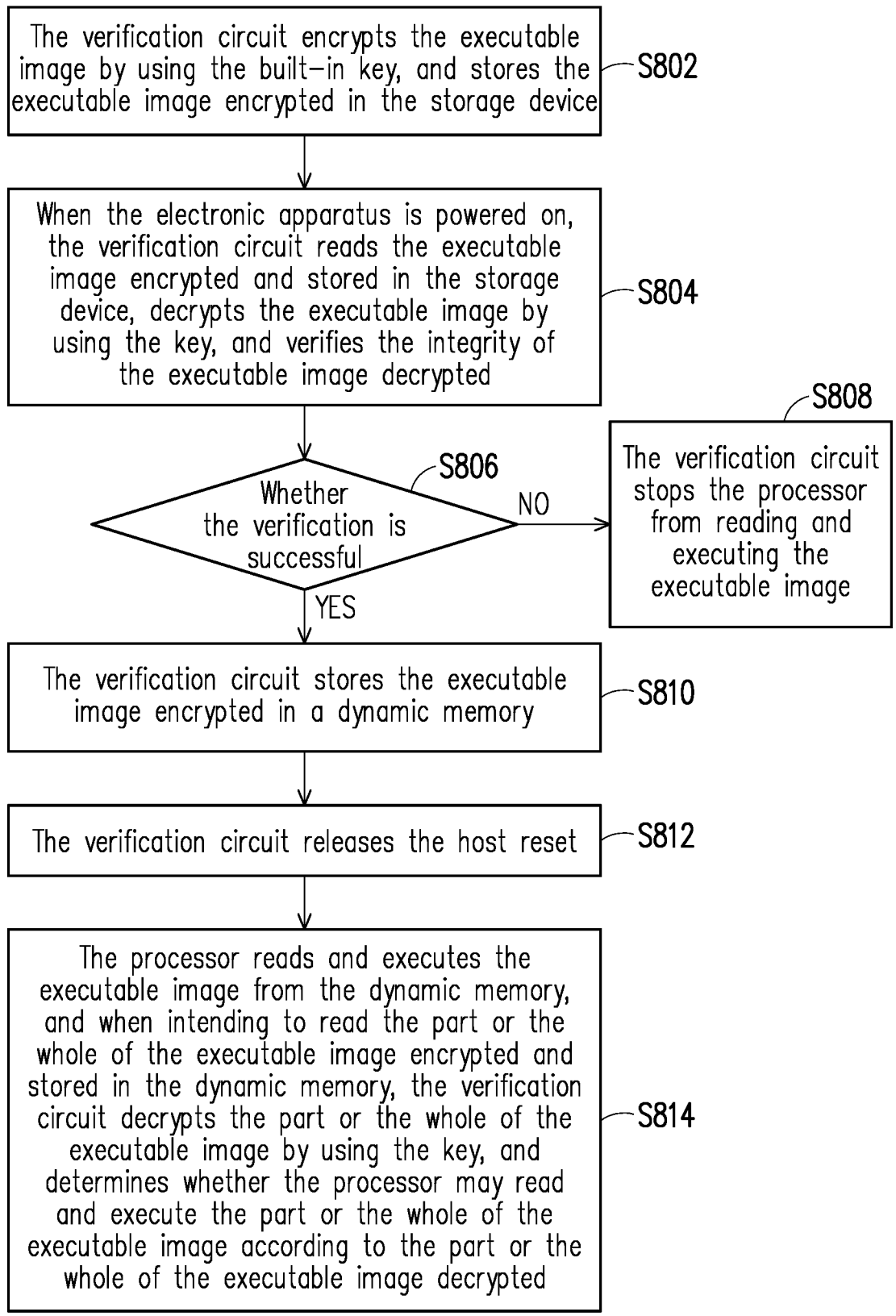
FIG. 8 is a flowchart of a data security verification method according to an embodiment of the disclosure.
Figure 9A:
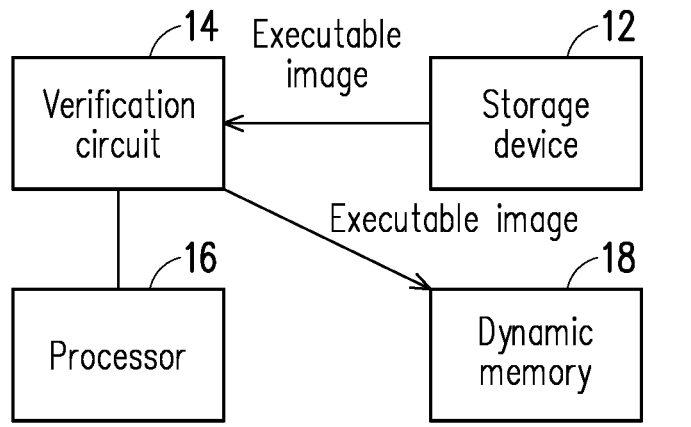
FIGS. 9A to 9B are schematic diagrams of an electronic apparatus executing a data security verification method according to an embodiment of the disclosure.
Figure 9A:
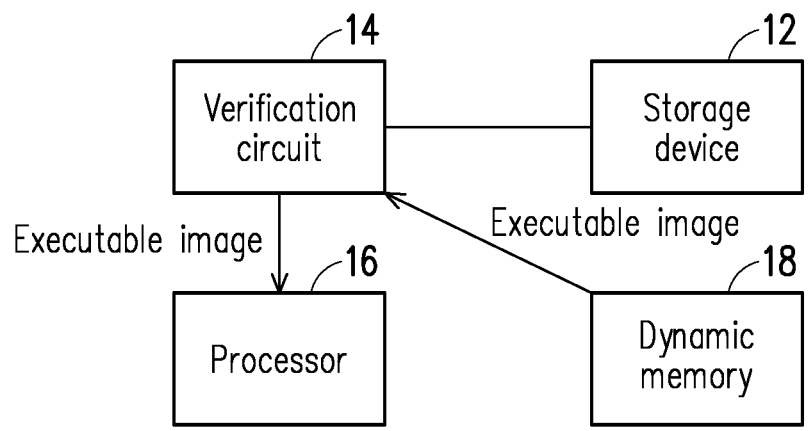
Figure 9B:
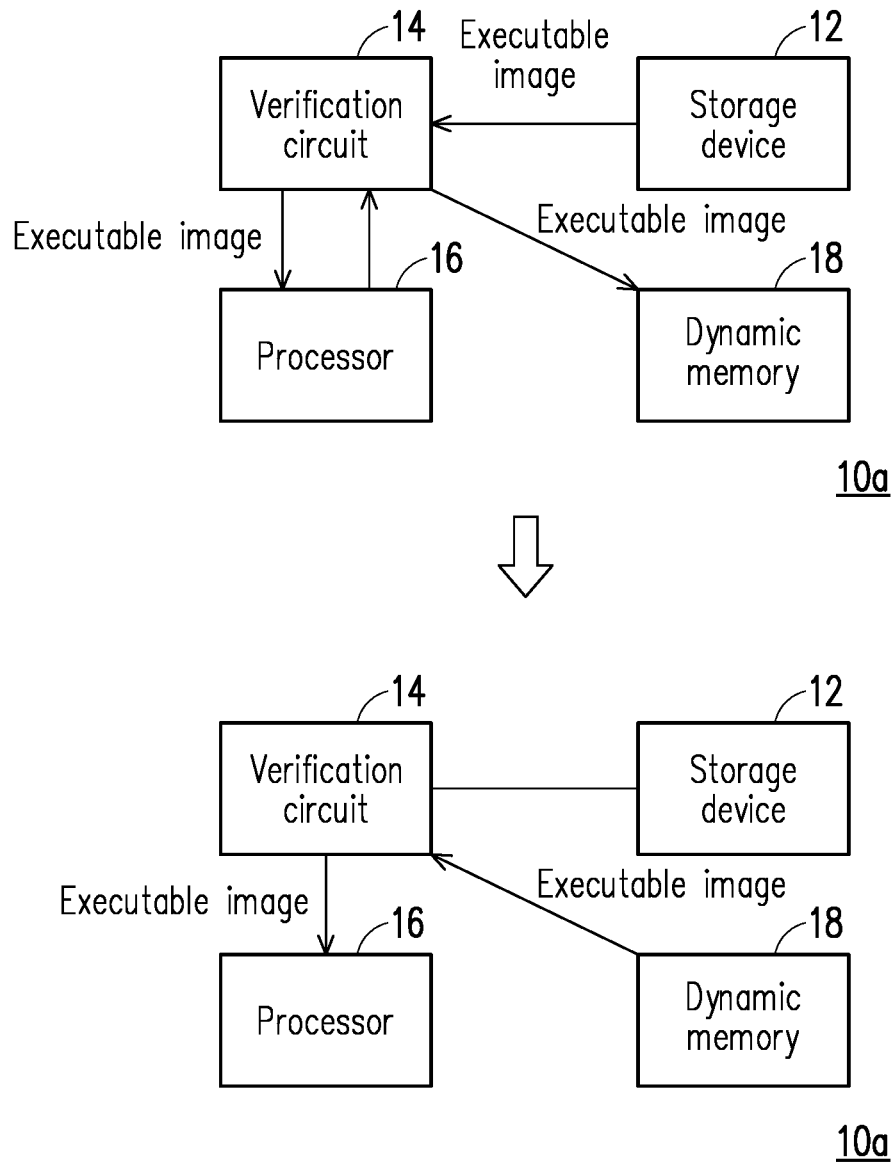

FIG. 8 is a flowchart of a data security verification method according to an embodiment of the disclosure. FIGS. 9A and 9B are schematic diagrams of an electronic apparatus executing a data security verification method according to an embodiment of the disclosure. Please refer to FIGS. 8, 9A, and 9B at the same time. The method of the embodiment is adapted for an electronic apparatus 10a of FIGS. 9A and 9B. The electronic apparatus 10a further includes a dynamic memory 18 in addition to the storage device 12, the verification circuit 14, and the processor 16 shown in FIG. 1. The dynamic memory 18 is, for example, a dynamic random access memory (DRAM) or other volatile memories, and serves as the main memory of the electronic apparatus 10a. When the dynamic memory 18 is powered off, the data stored therein disappears.

In step S802, the verification circuit 14 encrypts the executable image with the built-in key relative to the static memory, and stores the encrypted executable image in the storage device 12. In step S804, when the electronic apparatus 10 is powered on (in a boot process), the verification circuit 14 reads the encrypted executable image stored in the storage device 12, decrypts the executable image with the key, and verifies the integrity of the decrypted executable image. In step S806, the verification circuit 14 determines whether the verification of the integrity is successful. If the verification fails, then proceeds to step S808, and the verification circuit 14 stops the processor 16 from reading and executing the executable image. The above-mentioned steps S802 to S808 are the same as or similar to the steps S602 to S608 of the foregoing embodiment, so the detailed contents thereof are not repeated here.

The difference between this embodiment and the previous embodiment is step S810. In step S810, the verification circuit 14 decrypts the encrypted executable image that is read by the verification circuit 14 with the key corresponding to the static memory, encrypts the decrypted executable image with a key corresponding to another dynamic memory, and stores the encrypted executable image in the dynamic memory 18, as shown in 10a in FIG. 9A. Moreover, in step S812, the verification circuit 14 releases the host reset. If the key corresponding to the static memory here and the key corresponding to the dynamic memory are the same key, the verification circuit 14 may directly store the encrypted executable image in the dynamic memory 18. In some embodiments, the processor 16 may also actively move the encrypted executable image stored in the storage device 12 to the dynamic memory 18. However, during the process when the processor 16 reads the storage device 12, the read data needs to be decrypted by the verification circuit 14 and the integrity of the read data needs to be verified by the verification circuit 14, and then the processor 16 stores the corresponding data encrypted with the corresponding key by the verification circuit 14 in the dynamic memory 18, as shown in 10a in FIG. 9B.

In step S814, the processor 16 reads and executes the executable image from the dynamic memory 18. When the processor 16 intends to read the part or the whole of the encrypted executable image and stored in the dynamic memory 18, the verification circuit 14 decrypts the part or the whole of the executable image with the corresponding key again, and may determine whether the processor 16 may read and execute the part or the whole of the executable image according to the part or the whole of the decrypted executable image.

In some embodiments, when the verification circuit 14 stores the encrypted executable image that is read by the verification circuit 14 in the dynamic memory 18, the encrypted executable image may be stored in the form of plaintext or ciphertext. If the form of plaintext is used for storage and the block of the executable image is encrypted, the verification circuit 14 needs to decrypt the block of the encrypted executable image before storing the block of the executable image in the dynamic memory 18. At this time, when the processor 16 intends to read the content of the dynamic memory 18, decryption through the verification circuit 14 is not required. If the form of ciphertext is used for storage, when the processor 16 reads the encrypted executable image, decryption through the verification circuit 14 with the corresponding key is required first, as shown in FIGS. 9A and 9B. In this way, even if the executable image stored in the dynamic memory 18 is replaced by a malicious image, the malicious image cannot be executed after it is decrypted with the key, thereby ensuring the security of the executable image executed by the processor 16.

To sum up, the data security verification method and the electronic apparatus according to the embodiments of the disclosure not only verify the executable image in the static memory at the TOC, but also verify the data block read when the executable image is read at the TOU, thereby preventing the static memory from being subjected to the side channel attack. Moreover, the disclosure may improve the system performance while enhancing the security of the data through the verification of the root hash or the encryption and decryption of the data.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A data security verification method, adapted for an electronic apparatus having a storage device, a verification circuit, and a processor, the method comprising:
   verifying, by the verification circuit, integrity of an executable image in the storage device when the electronic apparatus is in a boot process, wherein the executable image is stored in a binary form, wherein the verification circuit includes a platform firmware resiliency (PFR) of root of trust (RoT);
   stopping, by the verification circuit, the processor from reading and executing the executable image if verification fails, wherein the verification circuit notifies system administrator to process the executable image;
   determining, by the verification circuit, that the processor reads and executes the executable image, and releasing a host reset if the verification is successful;
   enabling, by the processor, the verification circuit to encrypt the executable image with a built-in key, wherein the built-in key is an identification code generated by a device identifier composition engine (DICE), and wherein the built-in key is bound in the electronic apparatus; and
   re-verifying, by the verification circuit, a part or a whole of the executable image with another integrity verification program when the processor intends to read the part or the whole of the executable image in the storage device, and determining whether the processor reads and executes the part or the whole of the executable image according to a verification result.

2. The data security verification method according to claim 1, wherein verifying the integrity of the executable image in the storage device by the verification circuit comprises:
   verifying, by the verification circuit, root hash of the executable image in the storage device with a built-in signature, wherein
   if the root hash is invalid, the verification circuit stops the processor from executing the executable image; and
   if the root hash is valid, the verification circuit determines that the processor reads and executes the executable image and releases the host reset.

3. The data security verification method according to claim 2, wherein when the processor intends to read the part or the whole of the executable image in the storage device, re-verifying the part or the whole of the executable image with another integrity verification program by the verification circuit comprises:
   when the processor intends to read one of a plurality of data blocks of the executable image, calculating, by the verification circuit, hash of the data block with a hash tree created with the plurality of data blocks, and calculating upward to hash of a root node of the hash tree, so as to compare the hash calculated with the root hash verified in the boot process, and determine whether the processor reads and executes data of the data block according to a comparison result.

4. The data security verification method according to claim 3, further comprising:
   creating the hash tree with the plurality of data blocks, which comprises calculating hash of the plurality of data blocks of the executable image as a plurality of terminal nodes at the bottom of the hash tree, and calculating upward hash of a plurality of intermediate nodes and the root node of the hash tree.

5. The data security verification method according to claim 4, wherein creating the hash tree with the plurality of data blocks further comprises:
   assigning at least one attribute to each of the data blocks, or merging the data blocks consecutively read and adjacent, and calculating hash of the data blocks merged.

6. The data security verification method according to claim 5, wherein creating the hash tree with the plurality of data blocks further comprises:
   adding an attribute tag to the terminal node or the intermediate node of the hash tree to record the at least one attribute of the data block corresponded, and the at least one attribute comprising size, importance, number of reads, frequency of reads, or a verification policy of the data block.

7. The data security verification method according to claim 1, after the verification is successful and the host reset is released, further comprising:
   storing, by the processor, the encrypted executable image in a memory, wherein the built-in key comprises a key in a symmetric cryptography or a key in an asymmetric cryptography.

8. The data security verification method according to claim 7, further comprising:
   if the memory is a dynamic memory, decrypting, by the verification circuit, the part or the whole of the executable image with the built-in key when the processor intends to read the part or the whole of the encrypted executable image that is stored in the memory, and determining whether the processor reads and executes the part of the whole of the executable image according to the part or the whole of the decrypted executable image.

9. The data security verification method according to claim 7, further comprising:
   if the memory is a static memory, decrypting, by the verification circuit, the part or the whole of the executable image with the built-in key when the processor intends to read the part or the whole of the encrypted executable image that is stored in the memory, verifying the integrity of the part or the whole of the decrypted executable image or performing the another integrity verification program on the part or the whole of the decrypted executable image, and determining whether the processor reads and executes the part or the whole of the executable image according to a verification result.

10. The data security verification method according to claim 1, further comprising:
    storing, by the verification circuit, the executable image with secure flash.

11. An electronic apparatus, comprising:
    a storage device, storing an executable image;
    a verification circuit, coupled to the storage device, configured to verify integrity of the executable image in the storage device when the electronic apparatus is in a boot process, wherein if verification fails, the verification circuit stops the processor from executing the executable image, wherein the verification circuit notifies system administrator to process the executable image, and if the verification is successful, the verification circuit determines that the processor reads and executes the executable image, and releases a host reset, wherein the executable image is stored in a binary form, wherein the verification circuit includes a platform firmware resiliency (PFR) of root of trust (RoT); and
    a processor, coupled to the storage device and the verification circuit, and configured to read the executable image for booting when the verification circuit releases the host reset, and further configured to enable the verification circuit to encrypt the executable image with a built-in key, wherein the built-in key is an identification code generated by a device identifier composition engine (DICE), and wherein the built-in key is bound in the electronic apparatus,
    wherein when the processor intends to read a part or a whole of the executable image in the storage device, the verification circuit re-verifies the part of the whole of the executable image with another integrity verification program, and determines whether the processor reads and executes the part or the whole of the executable image according to a verification result.

12. The electronic apparatus according to claim 11, wherein the verification circuit comprises verifying root hash of the executable image in the storage device with a built-in signature, stopping the processor from executing the executable image when the root hash is invalid, and determining that the processor reads and executes the executable image and releasing the host reset when the root hash is valid.

13. The electronic apparatus according to claim 12, wherein when the processor intends to read one of a plurality of data blocks of the executable image, the verification circuit calculates hash of the data block with a hash tree created with the plurality of data blocks, and calculates upward to hash of a root node of the hash tree, so as to compare the hash calculated with the root hash verified in the boor process, and determine whether the processor reads and executes data of the data block according to a comparison result.

14. The electronic apparatus according to claim 13, wherein the verification circuit further creates the hash tree with the plurality of data blocks, which comprises calculating hash of the plurality of data blocks of the executable image as a plurality of terminal nodes at the bottom of the hash tree, and calculating upward hash of a plurality of intermediate nodes and the root node of the hash tree.

15. The electronic apparatus according to claim 14, wherein the verification circuit further assigns at least one attribute to each of the data blocks, or merges the data blocks consecutively read and adjacent, and calculates hash of the data block merged.

16. The electronic apparatus according to claim 15, wherein the verification circuit further adds an attribute tag to the terminal node or the intermediate node of the hash tree to record the at least one attribute of the data block corresponded, and the at least one attribute comprises size, importance, number of reads, frequency of reads, or a verification policy of the data block.

17. The electronic apparatus according to claim 11, wherein the processor further enables the verification circuit to store the encrypted executable image in a memory, and the built-in key comprises a key in a symmetric cryptography or a key in an asymmetric cryptography.

18. The electronic apparatus according to claim 17, wherein if the memory is a dynamic memory, when the processor intends to read the part or the whole of the encrypted executable image that is stored in the memory, the verification circuit decrypts the part or the whole of the executable image with the built-in key, and determines whether the processor reads and executes the part or the whole of the executable image according to the part or the whole of the decrypted executable image.

19. The electronic apparatus according to claim 17, wherein if the memory is a static memory, when the processor intends to read the part or the whole of the encrypted executable image that is stored in the memory, the verification circuit decrypts the part or the whole of the executable image with the built-in key, verifies the integrity of the part of the whole of the decrypted executable image or performs the another integrity verification program on the part or the whole of the decrypted executable image, and determines whether the processor reads and executes the part or the whole of the executable image according to a verification result.

20. The electronic apparatus according to claim 11, wherein the verification circuit further stores the executable image with secure flash.

* * * * *